United States Patent Office 3,476,655
Patented Nov. 4, 1969

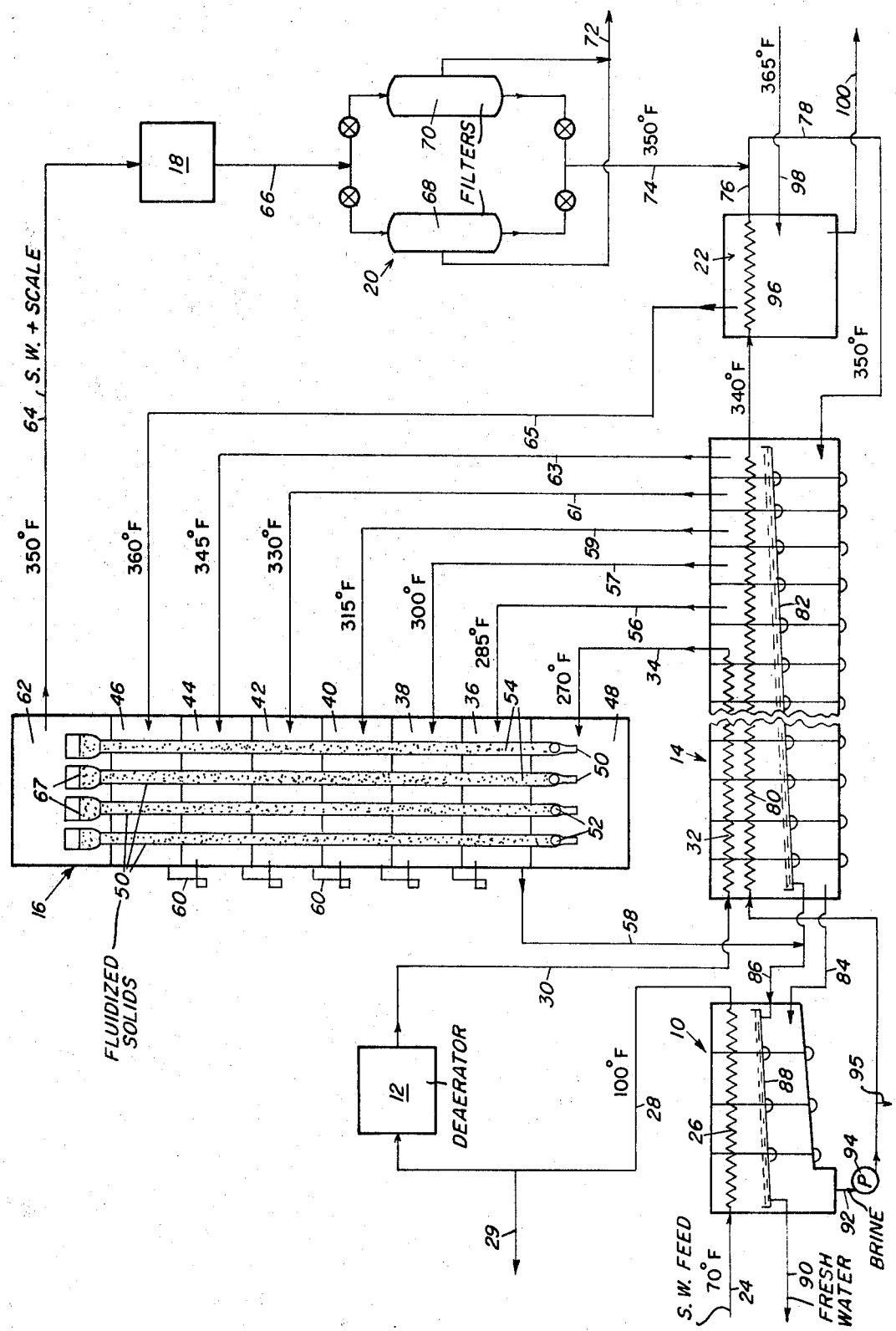

3,476,655
DESCALING OF SALINE WATER AND DISTILLATION
Everett N. Sieder, McLean, Va., assignor to the United States of America as represented by the Secretary of the Interior
Filed Nov. 1, 1967, Ser. No. 679,755
Int. Cl. B01d 3/34, 3/06; C02b 1/06
U.S. Cl. 203—7                    12 Claims

ABSTRACT OF THE DISCLOSURE

A scale removing system which may be used in distillation processes comprising a shell and tube fluidized bed preheater assembly in which sea water containing scale is indirectly heated by steam while serving as the fluidizing medium for a plurality of solid bodies such that small particles of scale are formed and are driven out of the preheater with descaled sea water. This mixture is then separated by conventional means.

This invention resulted from work done by the Office of Saline Water of the Department of the Interior, and the domestic title to the invention is in the Government.

BACKGROUND OF THE INVENTION

Field of invention

Broadly, this invention relates to a system for removing undesirable solid precipitates which form as a liquid is heated.

More particularly, this invention relates to a novel system for the conversion of saline water to potable water. In this form, the invention concerns an arrangement for heating and descaling distilland prior to evaporation in a high temperature distillation process.

Description of the prior art

Distillation is by far the most prominent process in use for the conversion of saline water. It has been generally recognized that evaporation beginning at high temperatures greatly enhances the efficiency and reduces the equipment cost in any distillation system and particularly in multistage processes. The foremost impediment preventing operation at high temperatures is the tendency for saline waters to form scale on heat exchanger surfaces. With sea water or similar waters, the scale formed consists of calcium carbonate, magnesium hydroxide and calcium sulfate. Below about 250–270° F. the scale formed consists substantially of calcium carbonate and magnesium hydroxide.[1] It has been suggested in the art that scale be prevented through the use of acid addition followed by decarbonation.[2] More recently it has been demonstrated that such a treatment can effectively prevent all carbonate and hydroxide scale,[3] but is not generally effective in preventing sulfate scale.[4]

Various methods to prevent sulfate scale have been tried including ion exchange treatments such as disclosed by McIlhenny et al. in U.S. Patent 3,056,651 and by Wirth in U.S. Patent 3,203,873, circulating a slurry of finely divided material through the evaporator as described by Badger in U.S. Patent 2,979,442 and by directly contacting the sea water with a combination of finely divided solid materials and steam as taught by Mayfield et al. in U.S. Patent 3,026,261. Each of these alternatives, however, has inherent problems which render its use with large scale distillation equipment disadvantageous.

In view of the obvious advantages of distillations from high temperatures and the difficulties present in prior art scale removing processes there remains a critical need for an efficient and effective means for scale prevention.

SUMMARY OF INVENTION

I have found that if sea water or other similar scale containing waters are passed upwardly through a combination indirect exchange preheater and fluidized bed in contact with a multiplicity of solid bodies and if the sea water is indirectly heated to progressively higher temperatures as it passes through this bed, small particles of scale will form within the sea water which can be later removed by filtration or other conventional separation means. This process used in combination with a multistage distillation system allows scale free operation at temperatures of 350° F. and above without great expense or inefficiencies.

Accordingly, the objects of this invention are:

To provide an improved scale prevention system for use with multistage distillation processes, and To provide an improved preheating system for use in multistage distillation processes.

BRIEF DESCRIPTION OF THE DRAWING

FIG. 1 is a schematic diagram illustrating the use of the present invention in combination with a multistage flash distillation process.

Referring now to the drawing, there is shown a multistage distillation process, wherein 10 represents a series of heat rejection stages, 12 a deaerator, 14 a series of heat recovery stages, 16 a preheater assembly, 18 a holding tank, 20 a sludge removal system, and 22 a brine heater.

A feed stream of ambient temperature sea water (shown in the fig. as 70° F.) enters tube bundles 26 of heat reject stages 10 wherein the tubes 26 are employed as the condensing surface for vapor which is flashed from a circulating brine. The feed seat water raised to a temperature of about 100° F. in stages 10 leaves those stages via line 28. A portion 29 of the sea water in this line is rejected from the system in order to maintain an overall thermodynamic balance. The remainder is deaerated at 12. Deaerated sea water is fed via 30 to tube bundle 32 of heat recovery stages 14 where the seat water is heated to a higher and higher temperature as tubes 32 serve as a condenser for vapor flashing from a circulating brine. At any appropriate point before or along its travel through stages 14, the sea water may be acidified and decarbonated by conventional means to prevent formation of alkaline scales which predominate at low temperatures. When the sea water in tubes 32 reaches a temperature of about 270° F., where acid treatments no longer can be depended upon for scale prevention, it is withdrawn and passed through line 34 to the preheater assembly 16. The preheater assembly as shown consists of a staged shell and tube heat exchanger. For purposes of illustration, the heat exchanger shown contains six stages 36, 38, 40, 42, 44 and 46. As will be appreciated upon consideration of the remainder of the disclosure, the number of stages in the heat exchanger is a matter of design which will depend upon the temperature at which scaling begins, the highest operating temperature in the system and the temperature increment present in the heat recovery stages.

Sea water from line 34 enters a lower portion 48 of assembly 16 and is then forced upwards through a plurality of tubes 50 by first passing through check valves 52.

---
[1] Proceedings, Symposium on Saline Water Conversion, 1957, page 31, National Academy of Science Publication No. 568, Washington, D.C. (1958).
[2] Hillier et al., Institute of Mechanical Engineers' Proceedings, vol. 113, 1952–53, pages 306–309, 319 and 330; Langelier et al., Industrial and Engineering Chemistry, vol. 42, page 128, January 1950; and Checkovich, U.S. Patent 3,119,752.
[3] 1965 Saline Water Conversion Report, page 171, Government Printing Office, Washington, D.C.
[4] 1964 Saline Water Conversion Report, page 139, Government Printing Office, Washington, D.C.

Within tubes 50 there are a plurality of solid bodies 54 which are maintained as a fluidized bed by the upward passage of the sea water. These bodies are balls or particles of solid material having a particle size and density such that they will not be carried off with the scale during fluidization. Materials which may be used include bodies of sand, silica, metals such as lead, copper, or steel, and organic materials such as polytetrafluoroethylene. Steam enters the shell of each stage and serves as the heating medium. As an example for purposes of illustration, steam 56 is shown entering stage 36 at a temperature of 285° F. whereas the incoming sea water 34 enters at around 270° F. Successive steam feeds 57, 59, 61, 63 and 65 provide heat for stages 38, 40, 42 and 46, respectively. The temperature of the steam in each successive stage increases as shown in the drawing so that steam 65 to the final stage 46 enters at 360° F. Consequently, the pressure in the shells of the successive stages likewise increases.

As the temperature of the sea water increases within tubes 50, a portion of the steam condenses within the shell of each stage. The total of this condensate 58 may be returned to a product water stream of the multistage distillation. The condensate may be collected separately from each stage or, as shown in the figure, condensate may be passed from upper to lower stages by means of loop seals 60 of the type well known in the art.

A preferred mode of carrying out the invention involves regulating the steam flow so that substantially all of the steam is condensed in the shell portion of the separate stages, and then selectively passing the condensate to the shell of the stage operating at the next lower temperature. As the hot condensate enters the lower temperature and pressure stage it will vaporize into steam before being recondensed by heat exchange with the cooler saline water in the tubes.

Within tubes 50, particles of scale form as the temperature of the sea water increases. hTe scale, being smaller in size and less dense than the solid bodies 54, is forced upward through the tubes. The fluidized bed of bodies 54 is maintained such that the bodies are kept within tubes 50. Check valves 52 prevent egress from the bottom and a series of simple screening devices 67 or the like prevent escape from the top tubes 50.

A combined slurry 62 of heated sea water and particulate scale leaves the upper portion 62 of preheater assembly 16 via line 64 and passes through a holding tank 18 before entering a sludge removal assembly 20 via 66.

In the figure accompanying assembly 20 is shown as comprising filters 68 and 70 which alternately receive slurry from 66 and separate it into a scale containing sludge 72 and a descaled sea water stream 74.

Methods of separating the particulate scale and sea water other than by filtration may be employed. For example, a centrifuge or a strainer may also be employed. After separation, sludge 72 is discarded and sea water 74 with a portion of the scale formers removed is mixed with hot brine 76 from heater 22 to form a combined brine stream 78. This brine then passes through stages 14 where the temperature and pressure conditions are such that water is vaporized by flashing from the brine, condensed on tube bundles 32 and 80 and collected in trays 82.

A portion of the vaporized water in the higher temperature stages of 14 provides heat to stages of preheater assembly 16. Thus, as shown in the drawing, steam lines 56, 57, 59, and 61 and 63 from the last five stages of 14 provide heat for the first five stages of the preheater.

The number and temperature of the stages of 14 which supply steam to the preheater are not critical. As previously mentioned, it is desired to heat incoming sea water 34 in heater 16 from a temperature just below that which scaling begins to the maximum operating temperature. Consequently, the number of stages necessary will depend upon the temperature increments of the heating steam which in turn will depend upon the design of stages 14. Normally the temperature increment will be smaller than the 15° F. shown and will generally be in the range of from about 5–10° F.

After passing through stages 14 the brine is then passed via 84 to heat reject stages 10 where it is further concentrated by flash evaporation. Also, the product water collected in trays 82 is passed through line 86 which is in communication with product water tray 88 in stages 10. Condensed water 58 may join the product water collection system at any convenient location. The drawing shows line 58 merging with 84.

Leaving stages 10 is a final product stream 90 and a concentrated brine 92. The latter is recirculated by driving means 94. A portion 95 of the decirculated brine is discarded as reject brine while the remainder provides the input to condenser tubes 80 of stages 14. Following passage through stages 14 the recirculated brine passes through tube bundles 96 of brine heater 22. Wherein the brine is raised to maximum temperature by steam 98. A portion of this steam is condensed in the heating process forming a condensate 100, while a portion 65 of noncondensed steam provides heat to the last stage 50 of preheater 16.

While the present scale removing system has been described in connection with a multistage flash distillation, it should be noted that it also finds utility in association with other kinds of distillation equipment and most particularly with multistage systems. Many modifications in the scale removing system itself without departing from the spirit or scope of the present invention are possible. For example, though the preferred method of operating preheater assembly is to provide a fluidized bed within the tubes and convey steam to the shell, the system may be reversed by passing the sea water through the shell and steam through the tubes. Other modifications of preheated assembly 16 which are within the skill of the art include changes in the design of valve means 52, screening devices 61, and condensate collecting system. If desirable, preheater assembly 16 may be physically divided so that each stage is adjacent to its source of steam. Finally, as previously described, any recognized liquid-solid separator may be used in the sludge separating assembly 20. Even further modification such as those in operating temperature conditions may be made to suit particular applications of the invention.

What is claimed is:

1. In a distillation process wherein sea water, containing scaling materials which are subject to deposition as solid precipitates at high temperatures, is heated to high temperatures, the improvement comprising removing said solid precipitates before the sea water is subjected to said high temperatures by
   (a) preheating the sea water feed by passing it through the initial chambers of a multistage flash distillation system as a condensing medium;
   (b) passing the preheated sea water prior to further heating at said high temperatures through a first compartment of an indirect heat exchanger containing therein a plurality of solid bodies and wherein said bodies are maintained within said first compartment in a fluidized condition by the upward flow of the sea water;
   (c) introducing a heating fluid to a second compartment of said heat exchanger whereby heat is exchanged to said sea water passing therethrough causing a portion of said materials to precipitate out in particulate form;
   (d) selectively removing upwardly a slurry of sea water and said particulate precipitate from said first compartment of said heat exchanger with said solid bodies remaining in said first compartment; and
   (e) separating said particulate precipitate from said sea water to recover descaled sea water for distillation.

2. The method of claim 1 wherein said liquid is saline water and said materials subject to deposition are scale formers.

3. The method of claim 2 wherein the heating fluid is steam.

4. The method of claim 3 wherein said first compartment comprises a plurality of tubes.

5. The method of claim 4 wherein the heat exchanger comprises a plurality of stages.

6. The method of claim 5 wherein said precipitated particulate scale formers are separated from said liquid by filtration.

7. The method of claim 5 wherein the temperature of said saline water is raised by operating each successive stage at a higher temperature.

8. The method of claim 7 wherein the flow of steam in said second compartments is controlled such that substantially all of said steam is condensed.

9. The method of claim 8 wherein condensate is successively passed between said second compartments of said stages in countercurrent relationship to the passage of said saline water in said tubes.

10. An apparatus for use in heating and distilling of saline waters subject to scale formation at increasing temperatures which comprises a substantially vertically aligned shell and tube heat exchanger, a plurality of discrete solid bodies positioned within the tube side means of said heat exchanger, means disposed at the top of said tube means to maintain said bodies within said tube side, means to pass said saline water upwardly through said tube side at a flow rate sufficient to create fluidization of said bodies, means to provide heating fluid to the shell side of said heat exchanger whereby said saline water within said tube side is heated causing particles of scale to form within the heated saline water, means to cause the withdrawal of said heated saline water and particulate scale from said tube side, and means for separating the particulate scale from said heated saline water to recover descaled water for distillation.

11. The apparatus of claim 10 wherein said shell portion of said heat exchanger is partitioned into a plurality of stages, means to provide heating fluid to each of said stages, and means to withdraw heating fluid from each of said stages.

12. The apparatus of claim 11 wherein said heating fluid provided to said stages is a gas subject to condensation to a liquid and wherein said means to withdraw heating fluid selectively withdraws said liquid.

References Cited

UNITED STATES PATENTS

| | | | |
|---|---|---|---|
| 2,979,442 | 4/1961 | Badger | 203—7 |
| 3,026,261 | 3/1962 | Mayfield et al. | 210—56 |
| 3,147,072 | 9/1964 | Thomsen | 203—11 X |
| 3,218,241 | 11/1965 | Checkovich | 203—7 |
| 3,361,648 | 1/1968 | Brown et al. | 203—11 |
| 3,376,204 | 4/1968 | Tidball | 202—173 |
| 3,392,089 | 7/1968 | Guptill et al. | 203—7 |
| 3,399,975 | 9/1968 | Otten | 203—7 X |
| 3,401,094 | 9/1968 | Lindsay | 202—173 X |
| 3,340,159 | 9/1967 | Tidball et al. | |

OTHER REFERENCES

Struthers Scientific and International Review, March 1965, pp. 6, 7 and 11–13.

NORMAN YUDKOFF, Primary Examiner

F. E. DRUMMOND, Assistant Examiner

U.S. Cl. X.R.

159—2; 202—173; 203—11, 88